(12) United States Patent
Kida

(10) Patent No.: US 8,884,951 B2
(45) Date of Patent: Nov. 11, 2014

(54) DEPTH ESTIMATION DATA GENERATING APPARATUS, DEPTH ESTIMATION DATA GENERATING METHOD, AND DEPTH ESTIMATION DATA GENERATING PROGRAM, AND PSEUDO THREE-DIMENSIONAL IMAGE GENERATING APPARATUS, PSEUDO THREE-DIMENSIONAL IMAGE GENERATING METHOD, AND PSEUDO THREE-DIMENSIONAL IMAGE GENERATING PROGRAM

(71) Applicant: JVC KENWOOD Corporation, Yokohama (JP)

(72) Inventor: Shingo Kida, Tokyo (JP)

(73) Assignee: JVC KENWOOD Corporation (JP)

( * ) Notice: Subject to any disclaimer, the term of this patent is extended or adjusted under 35 U.S.C. 154(b) by 0 days.

(21) Appl. No.: 13/714,784

(22) Filed: Dec. 14, 2012

(65) Prior Publication Data

US 2013/0162636 A1    Jun. 27, 2013

(30) Foreign Application Priority Data

Dec. 27, 2011  (JP) .................................. 2011-284811

(51) Int. Cl.
*G06T 15/00*   (2011.01)
*H04N 13/02*   (2006.01)

(52) U.S. Cl.
CPC ............ *G06T 15/005* (2013.01); *H04N 13/026* (2013.01)
USPC ........................................................ 345/419

(58) Field of Classification Search
CPC ................................. G06T 19/00; G06T 17/20
USPC .......................................................... 345/419
See application file for complete search history.

(56) References Cited

U.S. PATENT DOCUMENTS

2003/0122845 A1*   7/2003   Lee et al. ...................... 345/589
2009/0041339 A1*   2/2009   Yamada et al. ............... 382/154

(Continued)

FOREIGN PATENT DOCUMENTS

JP    2005151534    6/2005
JP    2006185033    7/2006

OTHER PUBLICATIONS

R. Fisher, S. Perkins, A. Walker, and E. Wolfart, "Contrast Stretching", 2003, http://homepages.inf.ed.ac.uk/rbf/HIPR2/stretch.htm.*

(Continued)

*Primary Examiner* — Javid A Amini
*Assistant Examiner* — Jin Ge
(74) *Attorney, Agent, or Firm* — Cantor Colburn LLP

(57) ABSTRACT

An average value, minimum value, and maximum value data detecting unit detects an average value, a minimum value, and a maximum value in one frame of a red (R) signal. A difference value calculating unit calculates a difference value by subtracting the average value from the R signal. A processing unit estimates the average value to be a level of a background image occupying a large area of a screen, and generates a signal indicating a minimum value (concavity) at the average value and a maximum value (convexity) at the maximum or minimum value as a compensated object signal. An adding unit adds the compensated object signal to a composed image of basic depth models to generate depth estimation data for generating an image in a different viewpoint from a non-3D image, the image in the different viewpoint and the non-3D image constituting the pseudo 3D image.

8 Claims, 13 Drawing Sheets

(56) References Cited

U.S. PATENT DOCUMENTS

| | | | |
|---|---|---|---|
| 2011/0080400 A1* | 4/2011 | Yamada | 345/419 |
| 2011/0090216 A1* | 4/2011 | Yamada et al. | 345/419 |
| 2011/0273531 A1* | 11/2011 | Ito et al. | 348/43 |
| 2012/0293489 A1* | 11/2012 | Chen et al. | 345/419 |

OTHER PUBLICATIONS

Yamada, et al., Disocclusion Based on the Texture Statistics of the Image Segmented by the Region Competition Algorithm, Institute of Image Information and Television Engineers Journal, vol. 56, 2002, pp. 863-866.

* cited by examiner

PRIOR ART

DEPTH ESTIMATION DATA GENERATING APPARATUS, DEPTH ESTIMATION DATA GENERATING METHOD, AND DEPTH ESTIMATION DATA GENERATING PROGRAM, AND PSEUDO THREE-DIMENSIONAL IMAGE GENERATING APPARATUS, PSEUDO THREE-DIMENSIONAL IMAGE GENERATING METHOD, AND PSEUDO THREE-DIMENSIONAL IMAGE GENERATING PROGRAM

CROSS-REFERENCE TO RELATED PATENT APPLICATIONS

This application claims the benefit of Japanese Patent Application No 2011-284811, filed on Dec. 27, 2011 in the Japan Patent Office, the disclosure of which is incorporated herein in its entirety by reference.

BACKGROUND OF THE INVENTION

1. Field of the Invention

The present invention relates to a depth estimation data generating apparatus, a depth estimation data generating method, and a depth estimation data generating program, and a pseudo three-dimensional (3D) image generating apparatus, a pseudo 3D image generating method, and a pseudo 3D image generating program, and more particularly, to a depth estimation data generating apparatus, a depth estimation data generating method, and a depth estimation data generating program, which generate depth estimation data from an image (non-3D image) in which depth information is neither explicitly included nor implicitly included unlike a stereo image that implicitly includes the depth information, and a pseudo 3D image generating apparatus, a pseudo 3D image generating method, and a pseudo 3D image generating program, which perform a process on the non-3D image based on the depth estimation data to generate a pseudo 3D image.

2. Description of the Related Art

In order to view a non-three-dimensional (3D) image in pseudo 3D, a 3D display system generates a pseudo 3D image from general still images or a plurality of time-series continuous images forming a moving image, i.e., from an image (non-3D image) in which depth information for a 3D effect is neither explicitly included nor implicitly included unlike a stereo image that implicitly includes the depth information.

An example of such a technology includes a pseudo 3D image creation device disclosed in Patent Document 1. In order to determine a scene structure to be as close to reality as much as possible, the pseudo 3D image creation device of Patent Document 1 determines a composition ratio according to high frequency component estimation values of a non-3D image input from an upper screen high frequency component estimation unit and a lower screen high frequency component estimation unit, by using images of a plurality of types of basic depth models indicating depth values respectively for a plurality of basic types of scene structures, and composes the images of the plurality of types of basic depth models according to the composition ratio. Then, the composed images of the basic depth models and a red (R) signal of the non-3D image are superimposed to generate final depth estimation data. Also, by performing a process based on the depth estimation data on an image signal of the non-3D image, an image signal of a different-viewpoint image having a 3D effect is generated.

The pseudo 3D image creation device of Patent Document 1 generates the final depth estimation data by composing the images of the plurality of types of basic depth models according to the composition ratio determined by the high frequency component evaluation values of the non-3D image, and superimposing the R signal of the non-3D image on the composed images of the basic depth models, and R signal is used as object information constituting information about concavity and convexity. Also, Patent Document 1 discloses that a blue (B) signal or a signal using both the R signal and B signal of the non-3D image may be used as the object information superimposed on the composed images of the basic depth models.

However, in the pseudo 3D image creation device of Patent Document 1, the images of the basic depth models are selected by analyzing a scene structure of the non-3D image. On the other hand, the object information does not reflect the result of analysis of the scene structure of the non-3D image even when any of the R signal, the B signal, or both the R and B signals is used. Also, since the pseudo 3D image creation device of Patent Document 1 simply adds the object information to the selected images of the basic depth models, there is problem, in which for example, a sense of separation between a background 121 and an object (such as a person) 122 is low, as shown in FIG. 10A.

(Patent Document 1) Japanese Laid-Open Patent Publication No. 2005-151534

SUMMARY OF THE INVENTION

The present invention provides a depth estimation data generating apparatus, a depth estimation data generating method, and a depth estimation data generating program, and a pseudo three-dimensional (3D) image generating apparatus, a pseudo 3D image generating method, and a pseudo 3D image generating program, which increase a 3D effect by improving a sense of separation between a background and an object.

According to an aspect of the present invention, there is provided a depth estimation data generating apparatus including: a generating unit which generates images of a plurality of basic depth models respectively indicating depth values of a plurality of basic scene structures; a composition ratio calculating unit which calculates a composition ratio between the images of the plurality of basic depth models by using statistics of at least some pixel values in a predetermined region in a screen of a non-three-dimensional (3D) image, so as to estimate a scene structure of the non-3D image in which depth information is neither explicitly included nor implicitly included unlike a stereo image that implicitly includes the depth information; a composing unit which generates a composed image of basic depth models by composing the images of the plurality of basic depth models generated from the generating unit according to the composition ratio; a detecting unit which receives an object signal indicating object information about concavity and convexity of a pseudo 3D image from the non-3D image, and detects an average value, a minimum value, and a maximum value in one frame or one field of the object signal; a processing unit which calculates a compensated object signal by compensating the object signal such that the compensated object signal has a minimum value when the object signal has the average value and the compensated object signal has a maximum value when the object signal has the minimum value or the maximum value: and an adding unit which adds the compensated object signal to the composed image of the basic depth models composed by the composing unit to generate depth estimation data for generating an image in a different viewpoint from the non-3D image, the image in the different viewpoint and the non-3D image constituting a pseudo 3D image.

According to another aspect of the present invention, there is provided a depth estimation data generating method including: calculating a composition ratio between images of a plurality of basic depth models respectively indicating depth values of a plurality of basic scene structures, by using statistics of at least some pixel values in a predetermined region in a screen of a non-3D image, so as to estimate a scene structure of the non-3D image in which depth information is neither explicitly included nor implicitly included unlike a stereo image that implicitly includes the depth is information; generating a composed image of basic depth models by composing the images of the plurality of basic depth models according to the composition ratio; receiving an object signal indicating object information about concavity and convexity of a pseudo 3D image from the non-3D image, and detecting an average value, a minimum value, and a maximum value in one frame or one field of the object signal; calculating a difference value by subtracting the detected average value from the object signal; when the difference value is negative, calculating a object signal that is on negative side from the average value by performing a normalization process of dividing the difference value by a difference between the detected minimum value and the detected average value and multiplying a predetermined value on the divided value, when the difference value is positive, calculating a object signal that is on positive side form the average value by performing a normalization process of dividing the difference value by a difference between the detected maximum value and the detected average value and multiplying a predetermined value on the divided value, and additionally calculating a signal having characteristics indicating a minimum value at the average value and a maximum value at the maximum or minimum value with respect to a compensation amount obtained by adding the negative compensation amount and the positive compensation amount, as a compensated object signal; and adding the compensated object signal to the composed image of basic depth models to generate depth estimation data for generating an image in a different viewpoint from the non-3D image, the image in the different viewpoint and non-3D image constituting a pseudo 3D image.

According to another aspect of the present invention, there is provided a depth estimation data generating method including: generating images of a plurality of basic depth models respectively indicating depth values of a plurality of basic scene structures; calculating a composition ratio between the images of the plurality of basic depth models by using statistics of at least some pixel values in a predetermined region in a screen of a non-3D image, so as to estimate a scene structure of the non-3D image in which depth information is neither explicitly included nor implicitly included unlike a stereo image that implicitly includes the depth information; generating a composed image of basic depth models by composing the images of the plurality of basic depth models according to the composition ratio; receiving an object signal indicating object information about concavity and convexity of a pseudo 3D image from the non-3D image, and detecting an average value, a minimum value, and a maximum value in one frame or one field of the object signal; processing a compensated object signal by compensating the object signal such that the compensated object signal has a minimum value when the object signal has the average value and the compensated object signal has a maximum value when the object signal has the minimum value or the maximum value; and adding the compensated object signal to the composed image of the basic depth models to generate depth estimation data for generating an image in a different viewpoint from the non-3D image, the image in the different viewpoint and non-3D image constituting a pseudo 3D image.

According to another aspect of the present invention, there is provided a depth estimation data generating program recorded in a recording medium, which realized by a computer, the program comprising: generating images of a plurality of basic depth models respectively indicating depth values of a plurality of basic scene structures; calculating a composition ratio between the images of the plurality of basic depth models by using statistics of at least some pixel values in a predetermined region in a screen of a non-3D image, so as to estimate a scene structure of the non-3D image in which depth information is neither explicitly included nor implicitly included unlike a stereo image that implicitly includes the depth information; generating a composed image of the basic depth models by composing the images of the plurality of basic depth models according to the composition ratio; receiving an object signal indicating object information about concavity and convexity of a pseudo 3D image from the non-3D image, and detecting an average value, a minimum value, and a maximum value in one frame or one field of the object signal; processing a compensated object signal by compensating the object signal such that the compensated object signal has a minimum value when the object signal has the average value and the compensated object signal has a maximum value when the object signal has the minimum value or the maximum value; and adding the compensated object signal to the composed image of basic depth models composed to generate depth estimation data for generating an image in a different viewpoint from the non-3D image, the image in the different viewpoint and non-3D image constituting a pseudo 3D image.

According to another aspect of the present invention, there is provided a pseudo three-dimensional (3D) image generating apparatus including: a different-viewpoint image generating unit which generates a different-viewpoint image from a viewpoint of a non-3D image, based on depth estimation data and the non-3D image, by shifting a texture of the non-3D image by an amount according to the depth estimation data of a corresponding portion, the depth estimation data being generated by any one of the above depth estimation data generating apparatus of the present invention which receives the non-3D image in which depth information is neither explicitly included nor implicitly included unlike a stereo image that implicitly includes the depth information; and an output unit which outputs a pseudo 3D image wherein one of the non-3D image and the different-viewpoint image is a left-eye image and the other is a right-eye image.

According to another aspect of the present invention, there is provided a pseudo three-dimensional (3D) image generating method including: generating a different-viewpoint image from a viewpoint of a non-3D image, based on depth estimation data and the non-3D image, by shifting a texture of the non-3D image by an amount according to the depth estimation data of a corresponding portion, the depth estimation data being generated by the above depth estimation data generating method from the non-3D image in which depth information is neither explicitly included nor implicitly included unlike a stereo image that implicitly includes the depth information; and outputting a pseudo 3D image wherein one of the non-3D image and the different-viewpoint image is a left-eye image and the other is a right-eye image.

According to another aspect of the present invention, there is provided a pseudo three-dimensional (3D) image generating program recorded in a recording medium, which is realized by a computer, the program including: generating a different-viewpoint image from a viewpoint of a non-3D image, based on depth estimation data and the non-3D image, by shifting a texture of the non-3D image by an amount according to the depth estimation data of a corresponding portion, the depth estimation data being generated by the above depth estimation data generating program from the non-3D image in which depth information is neither explicitly included nor implicitly included unlike a stereo image that implicitly includes the depth information; and outputting a pseudo 3D image wherein one of the non-3D image and the different-viewpoint image is a left-eye image and the other is a right-eye image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
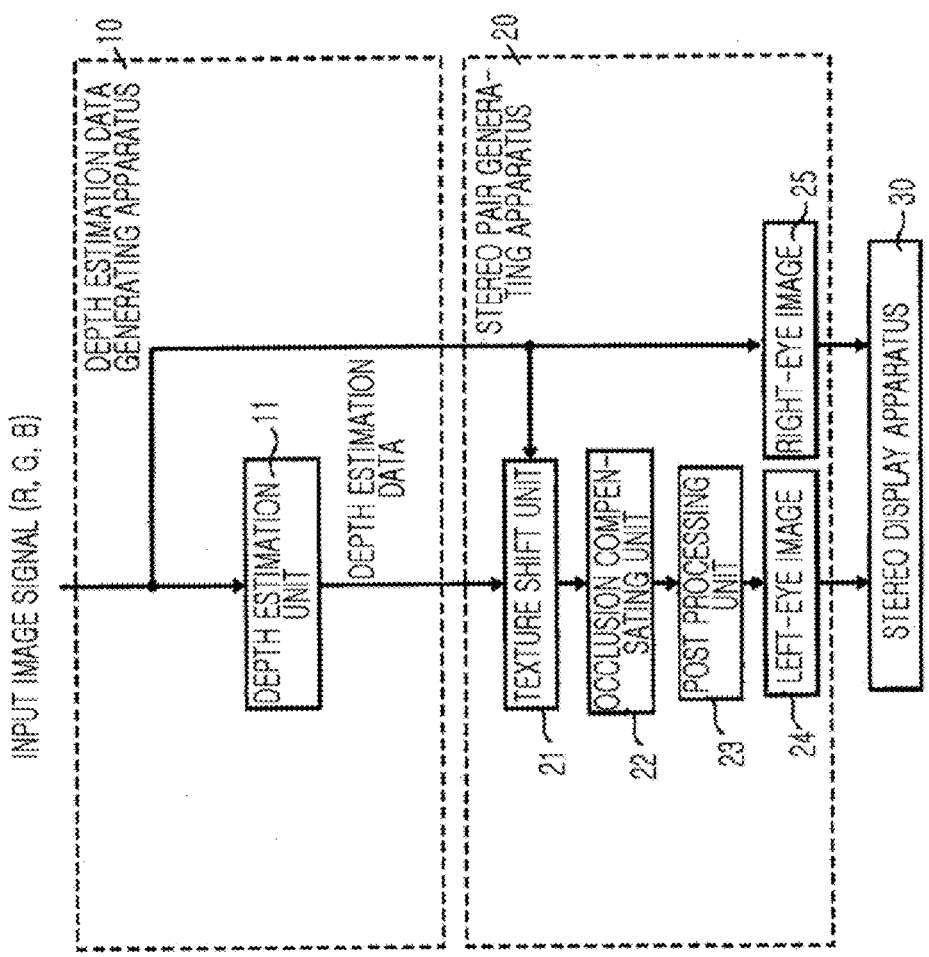
FIG. 1 is a block diagram showing a pseudo three-dimensional (3D) image generating apparatus according to an embodiment of the present invention.

FIG. 1 is a block diagram showing a pseudo three-dimensional (3D) image generating apparatus 1 according to an embodiment of the present invention. The pseudo 3D image generating apparatus 1 of the present embodiment is an apparatus which performs a so-called 2D-3D conversion to generate a pseudo 3D color image from a 2D color image (non-3D image) constituting a moving image using a plurality of time-series continuous images and including neither explicitly nor implicitly included depth information unlike a stereo image that implicitly includes the depth information, and generates an image in a different viewpoint from a viewpoint of the non-3D image based on an input image signal of the non-3D image.

The pseudo 3D image generating apparatus 1 includes, as shown in FIG. 1, a depth estimation data generating apparatus 10 which generates depth estimation data with respect to the input image signal of the non-3D image, and a stereo pair generating apparatus 20 which generates an image in a different viewpoint from an input non-3D image, wherein the image in the different viewpoint and the input non-3D image constitutes a pseudo 3D image, from the depth estimation data, and outputs the image in the different viewpoint with the input non-3D image as a stereo pair. A stereo display apparatus 30 displays a pseudo 3D image by receiving the stereo pair output from the stereo pair generating apparatus 20 as an input signal.

The depth estimation data generating apparatus 10 includes a depth estimation unit 11 constituting an embodiment of a depth estimation data generating apparatus of the present invention. The depth estimation unit 11 will be described in detail below. The stereo pair generating apparatus 20 includes a texture shift unit 21 which shifts a texture of the input non-3D image according to depth estimation data generated by the depth estimation unit 11, an occlusion compensating unit 22 which compensates for occlusion, and a post processing unit 23 which performs a post process. The stereo pair generating apparatus 20 outputs a left-eye image 24 that has been shifted by the post processing unit 23 and a right-eye image 25 constituting the input image signal. In other words, when the input non-3D image is the right-eye image 25, the stereo pair generating apparatus 20 generates the right-eye image 25 and the left-eye image 24 constituting a pseudo 3D image, and outputs the left-eye image 24 and the right-eye image 25 as a stereo pair. The stereo pair generating apparatus 20 forms a different-viewpoint image generating unit which generates a different-viewpoint image by shifting the texture of the non-3D image by an amount according to the depth estimation data of a corresponding portion based on the depth estimation data and the non-3D image.

A construction and operation of the depth estimation unit 11 constituting an embodiment of a depth estimation data generating apparatus of the present invention will now be described in detail.

Figure 2:
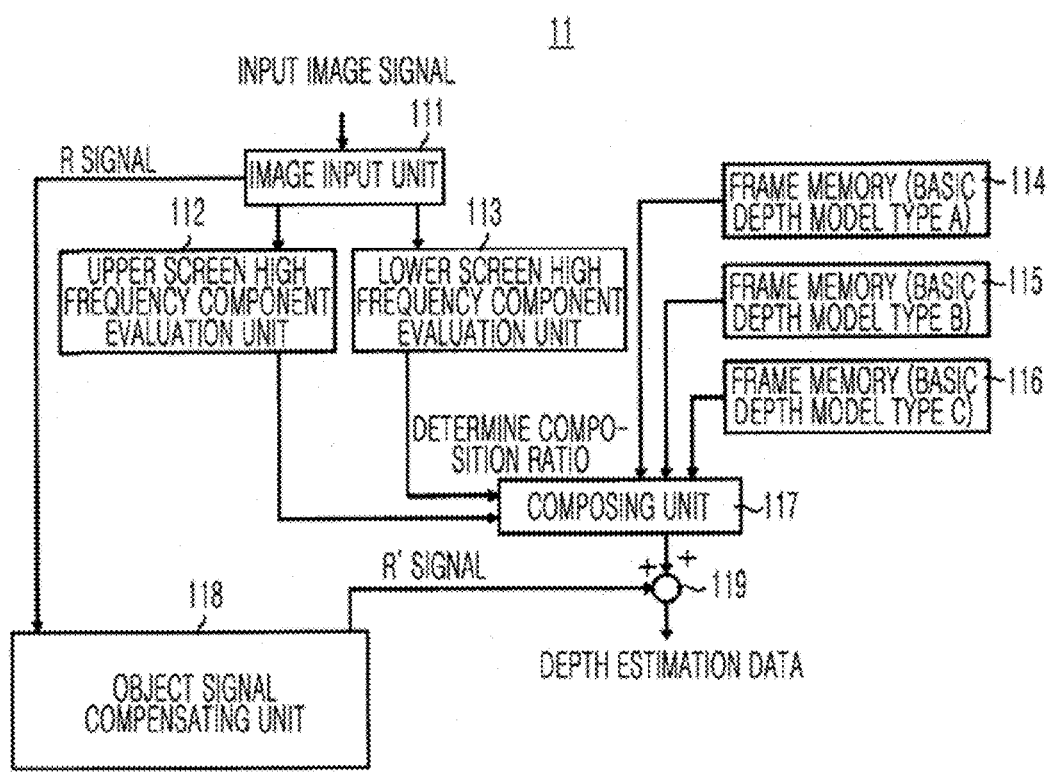
FIG. 2 is a block diagram of a depth estimation unit constituting depth estimation data generating apparatus according to an embodiment of the present invention.

FIG. 2 is a block diagram of the depth estimation unit 11 according to an embodiment of the present invention. As shown in FIG. 2, the depth estimation unit 11 includes an image input unit 111, an upper screen high frequency component evaluation unit 112, a lower screen high frequency component evaluation unit 113, frame memories 114 through 116, a composing unit 117, an object signal compensating unit 118, and an adding unit 119. The depth estimation unit 11 generates depth estimation data for generating an image in a different viewpoint from a non-3D image, the image in the different viewpoint and the non-3D image constituting a pseudo 3D image. The depth estimation unit 11 is characterized in including the object signal compensating unit 118.

In FIG. 2, the image input unit 111 includes a frame memory, temporarily stores an input image signal of one frame constituting a non-3D image signal, and then supplies a luminance signal in the input image signal of one frame to the upper screen high frequency component evaluation unit 112 and the lower screen high frequency component evaluation unit 113 and supplies a red (R) signal in the input image signal to the object signal compensating unit 118.

In the present invention, the upper screen high frequency component evaluation unit 112 and the lower screen high frequency component evaluation unit 113 along with some functions of the composing unit 117 form a composition ratio calculating unit which calculates a composition ratio between images of three types of basic depth models described below, by using statistics of at least some pixel values in a predetermined region of a screen of the non-3D image, so as to estimate a scene structure of each the non-3D image.

In other words, the upper screen high frequency component evaluation unit 112 obtains a high frequency component in a region corresponding to about 20% of an upper screen with respect to the input image signal of one frame and calculates an upper screen high frequency component evaluation value top_act. Then, the upper screen high frequency component evaluation unit 112 supplies the upper screen high frequency component evaluation value top_act to the composing unit 117. The lower screen high frequency component evaluation unit 113 obtains a high frequency component in a region corresponding to about 20% of a lower screen with respect to the input image signal of one frame and calculates a lower screen high frequency component evaluation value bottom_act. Then, the lower screen high frequency component evaluation unit 113 supplies the lower screen high frequency component evaluation value bottom_act to the composing unit 117. The upper screen high frequency component evaluation value top_act and the lower screen high frequency component evaluation value bottom_act indicate statistics of pixel values in predetermined regions (20%) of the upper screen and the lower screen of the non-3D image. Also, the high frequency component is a frequency signal component indicating an edge of the non-3D image. Here, the edge denotes a boundary between regions where characteristics of a luminance value, a color, a shape, etc. remarkably change, when a portion where the characteristics are similar is one region.

The frame memory 114 pre-stores an image of a basic depth model type A, the frame memory 115 pre-stores an image of a basic depth model type B, and the frame memory 116 pre-stores an image of a basic depth model type C, thereby forming an unit of generating an image of a basic depth model in the depth estimation data generating apparatus 10 of the present invention. Each of the images of the basic depth model types A through C is an image indicating a depth value of a basic scene structure for generating a pseudo 3D image signal.

Figure 3:
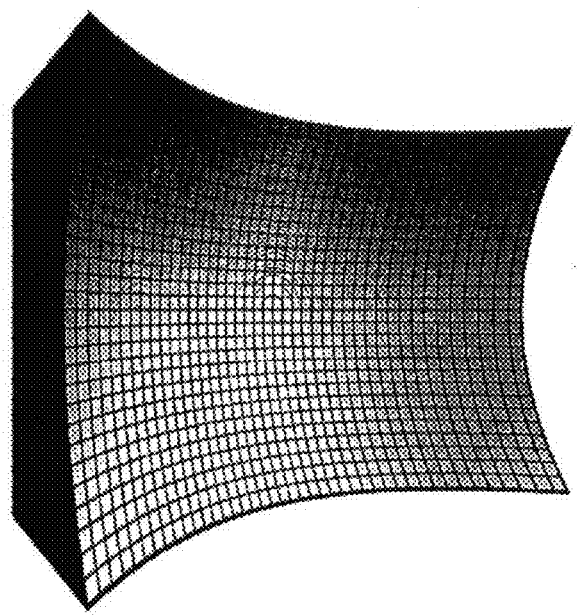
FIG. 3 is a view for showing an example of 3D structure of a basic depth model type A.

For example, the image of the basic depth model type A is an image of a depth model with a concave surface having a spherical shape, i.e., an image having a 3D structure shown in FIG. 3. The image of the basic depth model type A is used in many cases. In a scene where an object does not exist, a center of a screen may be set to be a longest distance, so as to obtain a 3D effect having low disharmony and comfortable depth.

Figure 4:
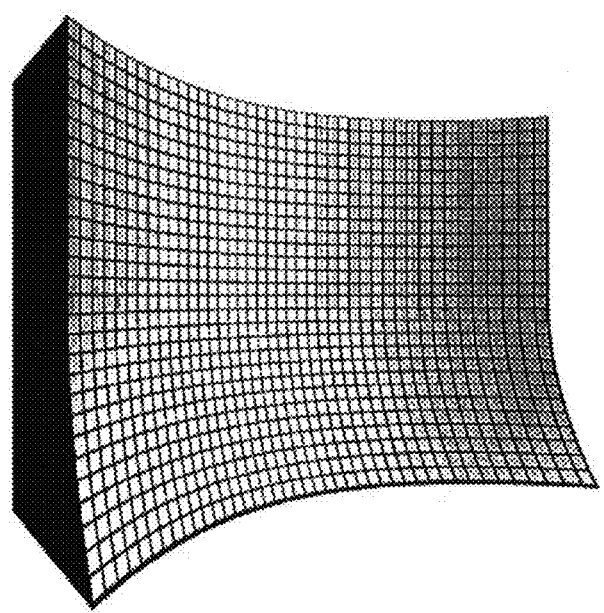
FIG. 4 is a view for showing an example of 3D structure of a basic depth model type B.

Also, the image of the basic depth model type B is obtained by replacing the spherical surface in top portion of the image of the basic depth model type A with an arch-shaped cylindrical surface. As a 3D structure shown in FIG. 4, the top portion is a cylindrical surface (an axis of the cylindrical surface is in a vertical direction) and a bottom portion is a concave surface (spherical surface).

Figure 5:
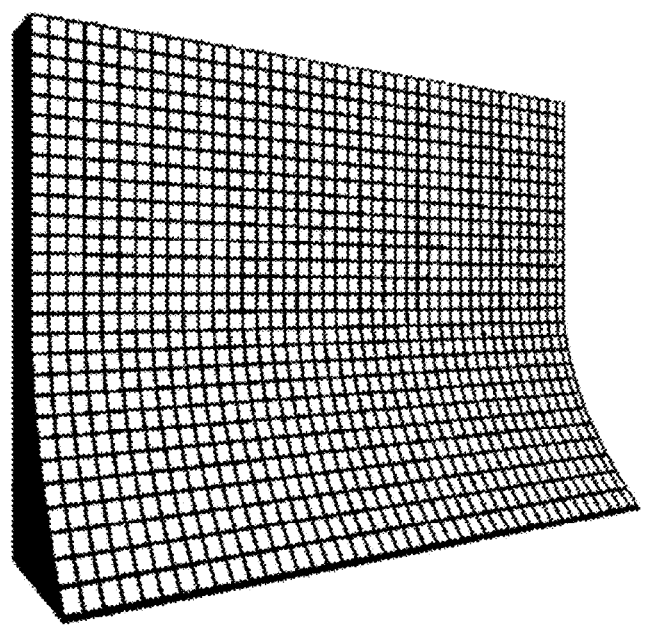
FIG. 5 is a view for showing an example of 3D structure of a basic depth model type C.

Also, the image of the basic depth model type C is an image of a model having a 3D structure shown in FIG. 5, wherein a top portion is a planar surface and a bottom portion is cylindrical surface continuously extending down from the planar surface and curving forward, and thus the top portion is the planar surface and the bottom portion is the cylindrical surface (an axis of the cylindrical surface is in a horizontal direction). The images of the basic depth model types A through C respectively stored in the frame memories 114 through 116 are supplied to the composing unit 117.

The composing unit 117 first automatically calculates a composition ratio k1 of the basic depth model type A, a composition ratio k2 of the basic depth model type B, and a composition ratio k3 of the basic depth model type C, based on the upper screen high frequency component evaluation value top_act supplied from the upper screen high frequency component evaluation unit 112 and the lower screen high frequency component evaluation value bottom_act supplied from the lower screen high frequency component evaluation unit 113 without regard to a scene of the image. Also, a sum of the three composition ratios k1 through k3 is always "1".

Figure 6:
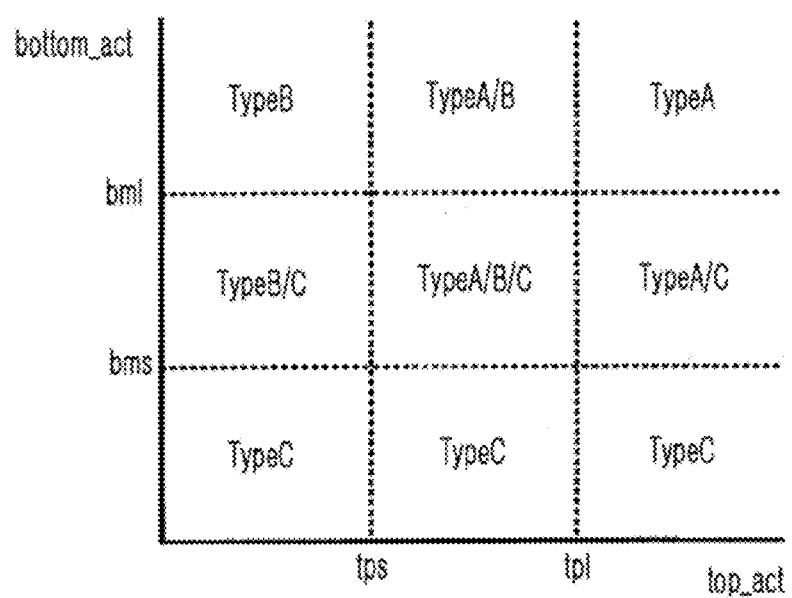
FIG. 6 is a diagram for explaining an example of a condition for determining a composition ratio of a basic depth model.

FIG. 6 is a diagram for explaining an example of a determination condition for a composition ratio. Referring to FIG. 6, a composition ratio is determined according to balance between each of the upper screen high frequency component evaluation value (hereinafter, abbreviated to a top high frequency component evaluation value) top act in a horizontal axis and the lower screen high frequency component evaluation value (hereinafter, abbreviated to a bottom high frequency component evaluation value) bottom_act in a vertical axis, and predetermined values tps, tpl, bms, and bml.

In FIG. 6, in regions where a plurality of types are written, the composition ratio is determined by linearly composing according to a high frequency component evaluation value. For example, in a region "Type A/B" of FIG. 6, a ratio of Type A constituting a value of the basic depth model type A and Type B constituting a value of the basic depth model type B is determined based on a ratio of the top high frequency component evaluation value top_act and the bottom high frequency component evaluation value bottom_act as below, and Type C constituting a value of the basic depth model type C is not used to determine the ratio.

Type A:Type B:Type C
=(top_act−tps):(tpl−top_act):0

Also, in a region "Type A/B/C" of FIG. 6, a value of Type A/B/C is determined as below by employing an average of Type A/B and Type A/C, Type A:Type B:Type C
=(top_act−tps)+(bottom_act−bms):(tpl−top_act):(bmi−bottom_act)

Also, each of the composition ratios k1, k2, and k3 is calculated as follows:

$$k1 = \text{Type } A/(\text{Type } A + \text{Type } B + \text{Type } C) \quad (1)$$

$$k2 = \text{Type } B/(\text{Type } A + \text{Type } B + \text{Type } C) \quad (2)$$

$$k3 = \text{Type } C/(\text{Type } A + \text{Type } B + \text{Type } C) \quad (3)$$

The composing unit 117 calculates each of a first multiplication result of the composition ratio k1 and Type A, i.e., the value of the basic depth model type A, a second multiplication result of the composition ratio k2 and Type B. i.e., the value of the basic depth model type B, and a third multiplication result of the composition ratio k3 and Type C, i.e., the value of the basic depth model type C, from among the composition ratios k1 through k3 calculated as above, and additionally adds the first through third multiplication results to generate an image signal constituting a composed depth model.

Also, the images of the basic depth model types A through C and the determination condition for the composition ratio are identical to the well-known images of basic depth model types A through C and the determination condition disclosed in Patent Document 1 by the present applicant, but are not limited thereto. Also, the structure of the composing unit 117 may be identical to the structure disclosed in Japanese Laid-Open Patent Publication No. 2006-185033 by the present applicant.

As such, in the present embodiment, the three types of basic depth models are prepared as depth structure models of a basic scene. And when the top high frequency component evaluation value top_act is small, it is recognized as a scene having a vacant space or a flat wall in the upper screen, and therefore the composing unit 117 increases a composition ratio of the image of the basic depth model type B, wherein the depth of the upper screen is deep, while using the image of the basic depth model type A as a basis. Whereas when the bottom high frequency component evaluation value bottom_act is small, it is recognized as a scene having a flat ground or water surface continuously spreading in front of the lower screen, and therefore the composing unit 117 increases a composition ratio of the image of the basic depth model type C, wherein the upper screen approximately has a planar surface in a distant view and the depth of the lower screen decreases downward, while using the image of the basic depth model A as a basis. Thus, according to the present embodiment, a scene structure that is close to reality as much as possible may be determined without disharmony in any image.

When the depth estimation data is generated as such by simply adding the R signal that is the object signal with respect to a composed image of the basic depth models output from the composing unit 117, the pseudo 3D image generated by using the depth estimation data may lack a sense of separation between a background and an object (such as a person) as described above.

Accordingly, in the present embodiment, the object signal compensating unit 118 generates a compensated object signal R' by compensating for the R signal according to a scene structure. The object signal compensating unit 118 compensates for the R signal (corresponds to the object signal indicating object information about the concavity and convexity of the pseudo 3D image) in the input image signal supplied from the image input unit 111, and supplies the compensated object signal R' to the adding unit 119.

One of the reasons for using the R signal as the object signal is based on experience rules that a size of the R signal is highly likely to match a concavity and convexity of a subject under conditions where brightnesses of textures are not largely different in front light situations. Another reason is that red and warm colors are advancing colors in chromatics, of which depths are recognized to be more outside than cold colors. Thus, by arranging the depths of the red and warm colors in front, it is possible to emphasize a 3D effect.

Figure 7:
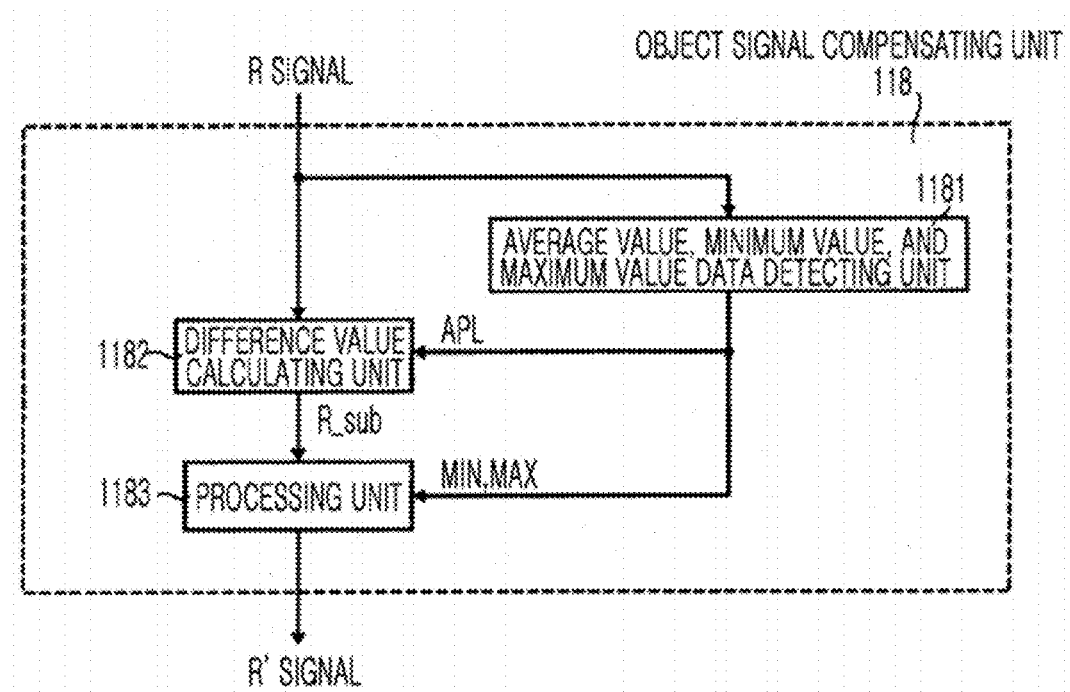
FIG. 7 is a block diagram of an object signal compensating unit of FIG. 2, according to an embodiment.

FIG. 7 is a block diagram of the object signal compensating unit 118 according to an embodiment of the present invention. As shown in FIG. 7, the object signal compensating unit 118 includes an average value, minimum value, and maximum value data detecting unit 1181 to which the R signal of one frame is supplied from the image input unit 111, a difference value calculating unit 1182, and a processing unit 1183 generating a compensated object signal (R' signal) by performing a predetermined operation as a difference value is supplied from the difference value calculating unit 1182 and a minimum value and a maximum value are supplied from the average value, minimum value, and maximum value data detecting unit 1181.

The average value, minimum value, and maximum value data detecting unit 1181 detects an average value APL, a minimum value MIN, and a maximum value MAX of pixel values of an input R signal of one frame, and supplies the average value APL to the difference value calculating unit 1182 and the minimum value MIN and the maximum value MAX to the processing unit 1183.

The difference value calculating unit 1182 calculates a difference value R_sub(j) by subtracting the average value APL from the input R signal according to Equation 4 below:

$$R\_sub(j)=j-APL \qquad (4)$$

Here, in Equation 4, j denotes a value of an R signal and APL denotes an average value (same below).

Figure 8A:
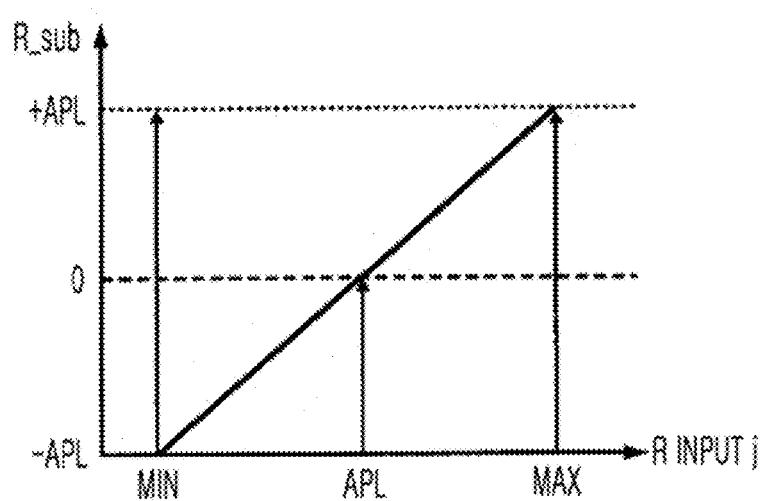
FIGS. 8A through 8C are graphs for showing an example of input and output characteristics of each unit of FIG. 7.

FIG. 8A shows input and output characteristics of the difference value calculating unit 1182, where a horizontal axis denotes an input R signal and a vertical axis denotes an output difference value R_sub(j). As shown in FIG. 8A, the difference value R_sub(j) is −APL when the R signal has the minimum value MIN, 0 when the R signal has the average value APL, and APL when the R signal has the maximum value MAX.

The processing unit 1183 estimates the average value APL as a level of a background image occupying a large area of a screen, and generates a signal indicating a minimum value (concavity) at the average value APL and a maximum value (convexity) at the maximum or minimum value MAX or MIN as a compensated object signal R".

Accordingly, first, when the difference value R_sub(j) supplied from the difference value calculating unit 1182 is negative, the processing unit 1183 calculates a compensation amount $S^-(j)$ that is on a negative side form APL by performing a normalization process according to Equation 5 by using the minimum value MIN supplied from the average value, minimum value, and maximum value data detecting unit 1181.

$$S^-(j)=R\_sub(j) \times Lim/(MIN-APL) \qquad (5)$$

Here, in Equation 5, Lim denotes a limit threshold value, MIN denotes a minimum value, and APL denotes an average value.

Figure 8B:
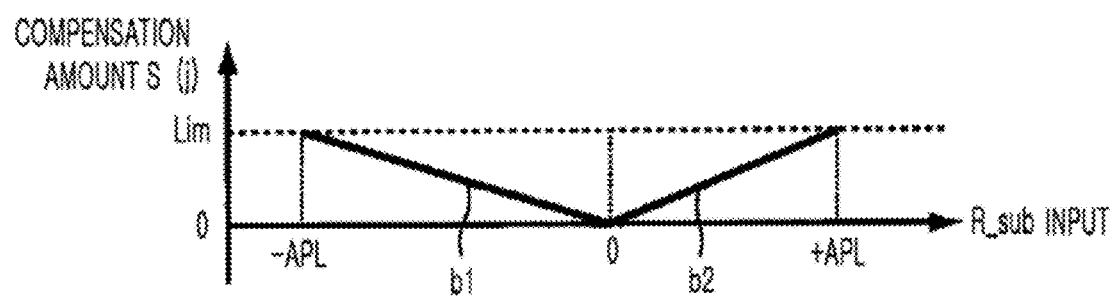

According to the normalization process using the minimum value MIN, the difference value R_sub(j) that is smaller than 0 is compensated for by corresponding to a predetermined upper limit of a dynamic range of an object signal by using the minimum value MIN, and calculates the compensation amount $S^-(j)$ that is on a negative side from the average value APL. For example, with reference to FIG. 8B, when the R signals having the average value APL, the minimum value MIN, and the maximum value MAX are input, characteristics indicated by b1 that is a range of the difference value R_sub(j) from 0 to −APL denotes the negative compensation amount $S^-(j)$.

Since the negative compensation amount $S^-(j)$ linearly increases from 0 to the limit threshold value Lim as the difference value R_sub(j) decreases from 0 to −APL, the negative compensation amount $S^-(j)$ may extend up to the upper limit of the dynamic range by pre-setting the limit threshold value Lim to the upper limit of the dynamic range of the object signal.

Then, when the difference value R_sub(j) supplied from the difference value calculating unit 1182 is positive, the processing unit 1183 calculates a compensation amount $S^+(j)$ that is on a positive side from APL by performing a normalization process according to Equation 6 by using the maximum value MAX supplied from the average value, minimum value, and maximum value data detecting unit 1181.

$$S^+(j)=R\_sub(j) \times Lim/(MAX-APL) \qquad (6)$$

Here, in Equation 6, Lim denotes a limit threshold value, MAX denotes a maximum value, and APL denotes an average value.

According to the normalization process using the maximum value MAX, the difference value R_sub(j) that is higher than 0 is compensated for by corresponding to a predetermined upper limit of a dynamic range of an object signal by using the maximum value MAX, and calculates the compensation amount $S^+(j)$ that is on a positive from the average value APL. For example, with reference to FIG. 8B, when the R signals having the average value APL, the minimum value MIN, and the maximum value MAX are input, characteristics indicated by b2 that is a range of the difference value R_sub(j) from 0 to +APL denote the positive compensation amount $S^+(j)$.

Since the positive compensation amount $S^+(j)$ linearly increases from 0 to the limit threshold value Lim as the difference value R_sub(j) increases from 0 to +APL, the positive compensation amount $S^+(j)$ may extend up to the upper limit of the dynamic range by pre-setting the limit threshold value Lim to the upper limit of the dynamic range of the object signal.

When the negative compensation amount $S^-(j)$ and the positive compensation amount $S^+(j)$ are added to obtain a compensation amount S(j), the compensation amount S(j) may be according to Equations 7-1 to 7-3.

(i) when j<APL $$S(j)=S^-(j) \quad (7\text{-}1)$$

(ii) when j>APL $$S(j)=S^+(j) \quad (7\text{-}2)$$

(iii) when j=APL $$S(j)=0 \quad (7\text{-}3)$$

Then, the processing unit 1183 performs a process of extending the average value APL to −Lim that is a lower limit of the dynamic range with respect to the compensation amount S(j) according to Equation 8 below, and outputs the result of processing as an object signal (R' signal) after final compensation.

$$R'(j)=2\times S(j)-Lim \quad (8)$$

Figure 8C:
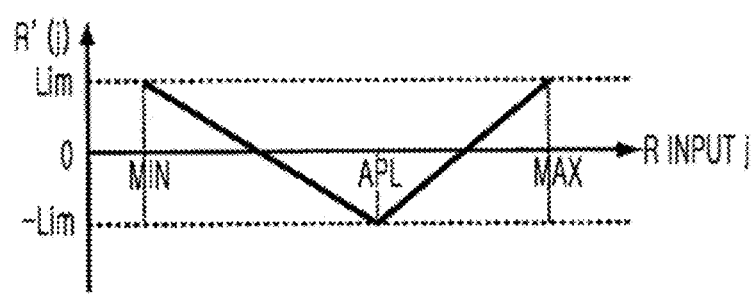

FIG. 8C is a characteristic diagram of an R' signal output after compensation with respect to an input R signal based on Equation 8. As shown in FIG. 8C, the R' signal after compensation has a minimum value −Lim when the input. R signal has an average value APL, and has a limit threshold value Lim that is a maximum value when the input R signal has a minimum value MIN or a maximum value MAX. Also, a level of the R' signal after compensation linearly decreases from +Lim to −Lim as a signal level of the input R signal increases from the minimum value MIN to the average value APL, and linearly increases from −Lim to +Lim as the signal level of the input R signal increases from the average value APL to the maximum value MAX.

The adding unit 119 generates depth estimation data by adding the composed image of the basic depth models supplied from the composing unit 117 and the R' signal that is the compensated object signal supplied from the object signal compensating unit 118, and outputs the depth estimation data to the stereo pair generating apparatus 20.

As such, according to the present embodiment, since a value of the R' signal that is the compensated object signal becomes small by estimating that the R signal having the average value APL occupying a large area of the input non-3D image is a signal of a background image, the pseudo 3D image is disposed inside. Whereas since the value of the R' signal that is the compensated object signal become high by estimating that the R signal near the minimum value MIN or the maximum value MAX occupying a small area of the input non-3D image is an object (such as a person), the pseudo 3D image is disposed in front. Accordingly, a feeling as if the object (such as a person) is protruding in the pseudo 3D image may be emphasized.

Referring back to FIG. 1, the texture shift unit 21 generates the image signal in a different viewpoint from the input image signal, based on the depth estimation data generated by the adding unit 119 in the depth estimation unit 11 as described above and the input image signal of the non-3D image. For example, when the input image signal is a right-eye image signal, the texture shift unit 21 generates an image signal having a viewpoint moved to the left, based on a viewpoint of the right-eye image signal displayed on a screen.

In this case, since a closer an image is, the more inward (towards a nose) the image looks to a user when a texture is displayed in a close-range view with respect to the user, the texture shift unit 21 generates an image signal where the texture is moved to the right of the screen by an amount according to the depth. Also, since a farther an image is, the more outward the image looks to the user when the texture is displayed in a distant view with respect to the user, the texture shift unit 21 generates an image signal where the texture is moved to the left of the screen by an amount according to the depth.

Here, depth estimation data of each pixel is indicated by a value Dd in 8 bits. The texture shift unit 21 generates an image signal where a texture of an input right-eye image signal corresponding to the value Dd is shifted to the right by a (Dd−m)/n pixel for each pixel, in an order from a small Dd (i.e., from a texture disposed inside the screen). Here, m denotes a parameter (convergence value) showing extrusion, and n denotes a parameter (depth value) showing dept.

Also, for the user, a texture in which a value Dd indicating a depth estimation value is small is shown to be inside the screen, and a texture in which a value Dd indicating a depth estimation value is large is shown to be in front of the screen. The value Dd indicating depth estimation data, the convergence value m, and the depth value n are each in a range from 0 to 255, and for example, the convergence value m is 200 and the depth value n is 20.

The occlusion compensating unit 22 performs occlusion compensation on the image signal in the different viewpoint output from the texture shift unit 21, and supplies the occlusion-compensated image signal to the post processing unit 23. Occlusion means a portion where a texture does not exist by a location relationship change in an image after shifting a texture. The occlusion compensating unit 22 fills an occlusion location by using an original input right-eye image signal corresponding to the texture-shifted image signal. Alternatively, occlusion may be compensated for by using a method disclosed in the well-known document (Kunio Yamada, Kenji Mochizuki, Kiyoharu Aizawa, and Takahiro Saito: "Disocclusion Based on the Texture Statistics of the Image Segmented by the Region Competition Algorithm" The Journal of the Institute of Image Information and Television Engineers, Vol. 56, No. 5, pp. 863-866 (2002.5)).

The post processing unit 23 constituting a post processing means performs a post process, such as smoothing or noise removal, on the image signal that is occlusion-compensated by the occlusion compensating unit 22, by using a well-known method as occasion demands, and outputs a left-eye image signal indicating the left-eye image 24.

Here, regarding the (Dd−m) n pixel constituting the shift amount of the image signal output by the texture shift unit 21, since the convergence value m and the depth value n, except the value Dd of the depth estimation data changed by the input image signal are fixed values and are all in the range from 0 to 255, a maximum pixel shift amount may be obtained. When the maximum pixel shift amount is obtained, a maximum parallax angle may be obtained from a pixel number of an image and a standard viewing distance during reproduction. When the convergence value m and the depth value n are suitably set, a 2D-3D converted image enters a parallax angle in a determined range. Thus, the pseudo 3D image generating apparatus 1 outputs the left-eye image signal that is 2D-3D converted and output from the post processing unit 23, as the left-eye image 24, and uses the left-eye image signal as a standard (sample) for adjusting a base length or convergence angle. Also, the pseudo 3D image generating apparatus 1 outputs the input image signal as the right-eye image 25.

As such, the stereo pair generating apparatus 20 generates the left-eye image 24 in a different viewpoint from the input non-3D image (here, the right-eye image 25) based on the depth estimation data generated by the depth estimation unit 11, and outputs the left-eye image 24 along with the input non-3D image (the right-eye image 25) as a stereo pair displaying a pseudo 3D image. The left-eye image 24 and the right-eye image 25 are output to the stereo display apparatus 30.

The stereo display apparatus 30 includes a projection system in which polarized glasses are used, a projection system or a display system in which a field sequential display and liquid crystal shutter glasses are combined, a lenticular-mode stereo display, an anaglyph-mode stereo display, a head-mounted display, and so on. In particular, the stereo display apparatus 30 includes a projector system composed of two projectors each corresponding to an image of a stereo image.

A pseudo 3D image display system capable of stereovision by converting a non-3D image to a pseudo 3D image may be formed by combining the depth estimation data generating apparatus 10, the stereo pair generating apparatus 20, and the stereo display apparatus 30.

Figure 10A:
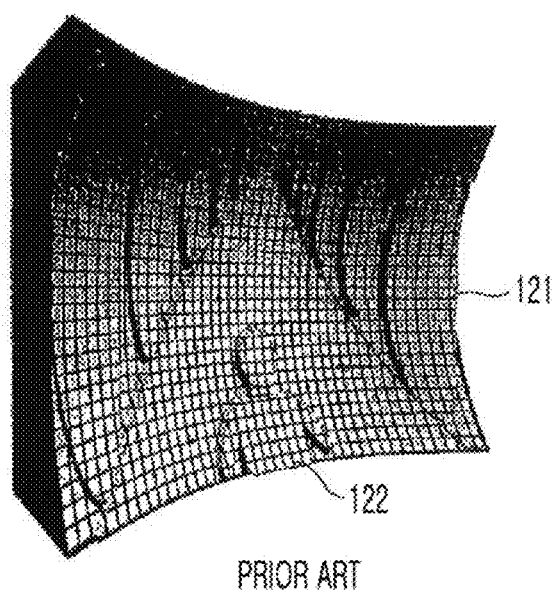
FIGS. 10A and 10B are views for comparing an example of a pseudo 3D image of Patent Document 1, and an example of a pseudo 3D image generated by depth estimation data of the present invention.
Figure 10B:
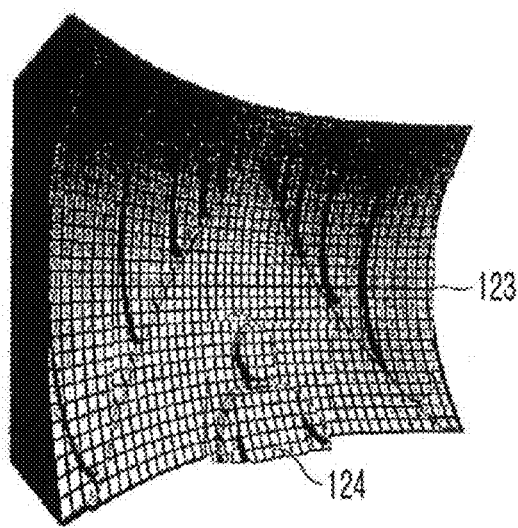

Next, the pseudo 3D image according to the pseudo 3D image generating apparatus 1 of the present embodiment and a pseudo 3D image according to a pseudo 3D image creation device disclosed in Patent Document 1 will now be described. As described above, according to the pseudo 3D image generated by the pseudo 3D image creation device disclosed in Patent Document 1, since the depth estimation data is generated by simply adding the object signal to the composed image of the basic depth models, the pseudo 3D image that does not reflect the scene analysis is displayed, and for example, as shown in FIG. 10A, a sense of separation between a background 121 and an object (such as a person) 122 is low.

In this regard, according to the pseudo 3D image generated by the pseudo 3D image generating apparatus 1 of the present embodiment, since the depth estimation data is generated by adding the compensated object signal, to which a scene structure is reflected, to the composed image of the basic depth models, the pseudo 3D image based on the depth estimation data, for example, as shown in FIG. 108, is arranged to emphasize a feeling that a background 123 is disposed inside a screen and an object (such as a person) 124 protrudes in front of the screen. Thus, according to the present embodiment, the pseudo 3D image in which a sense of separation between the background 123 and the object (such as a person) 124 is improved and having a sufficient 3D effect may be obtained.

Also, the present invention is not limited to above embodiments, and may include other various modified examples. For example, in the above embodiments, the processing unit 1183 is described to generate the R' signal shown in FIG. 8C of which the maximum value is limited to the limit threshold value +Lim and the minimum value is limited to the negative limit threshold value −Lim, but the R' signal may not be limited by the limit threshold value Lim.

Figure 9:
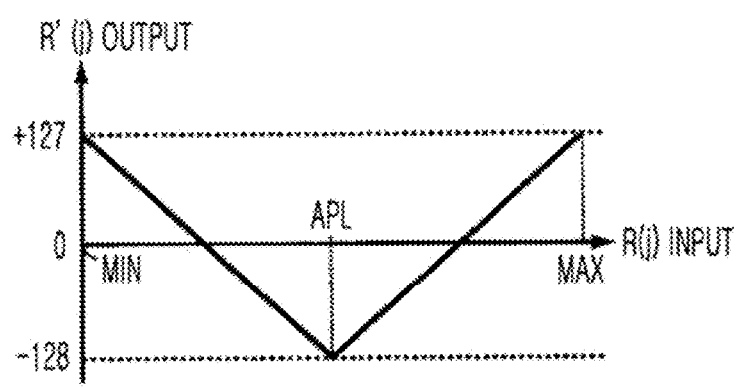
FIG. 9 is a graph for showing another example of a relationship between an object signal and a compensated object signal.

For example, with respect to the R signal of the input image signal of 8 bits, as shown in FIG. 9, a signal having characteristics where a signal level linearly decreases from a maximum value +127 to a minimum value −128 as a signal level of the R signal increases from the minimum value MIN to the average value APL in one frame and linearly increases from the minimum value −128 to the maximum value +127 as the signal level of the R signal decreases from the average value APL to the maximum value MAX in one frame may be generated as the compensated object signal.

Also, the object signal to be compensated for by the object signal compensating unit 118 is not limited to the R signal, and may be a blue (B) signal Red and warm colors are advancing colors, whereas blue is a receding color of which a depth is recognized to be more inside than warm colors. Accordingly, even if a blue portion is disposed inside, a 3D effect may be emphasized. Furthermore, a 3D effect may be emphasized by disposing a red portion in front and a blue portion inside by using both R and B signals as an object signal.

Also, the stereo pair generating apparatus 20 generates the left-eye image 24 by using the input non-3D image as the right-eye image 25, but alternatively, a right-eye image may be generated by using the input non-3D image as a left-eye image, and furthermore, a stereo pair may be formed by using right- and left-eye images as different-viewpoint images, i.e., by using a different-viewpoint image in which a viewpoint is moved to the right and a different-viewpoint image in which a viewpoint is moved the left.

Also, a pseudo 3D display system may include an audio output unit. In this case, an environment sound matching an image may be added with respect to image content that does not contain audio information, such as a still image. Also, unit of images for detecting an average value, a minimum value, and a maximum value is one frame, but alternatively, the unit of images may be one field.

Also, the present invention is not limited to forming the pseudo 3D image generating apparatus 1 of FIG. 1 or the depth estimation data generating apparatus 10 of FIGS. 2 and 7 by using hardware, and alternatively, a pseudo 3D image or depth estimation data may be generated by using software according to a computer program. In this case, the computer program may be read from a recording medium by a computer or read by a computer via a network.

According to the present invention, a sense of separation between a background and an object of a pseudo 3D image is improved, thereby increasing a 3D effect.

While this invention has been particularly shown and described with reference to exemplary embodiments thereof, it will be understood by one of ordinary skill in the art that various changes in form and details may be made therein without departing from the spirit and scope of the invention as defined by the appended claims.

What is claimed is:

1. A depth estimation data generating apparatus comprising:
 a generating unit which generates images of a plurality of basic depth models respectively indicating depth values of a plurality of basic scene structures;
 a composition ratio calculating unit which calculates a composition ratio between the images of the plurality of basic depth models by using statistics of at least some pixel values in a predetermined region in a screen of a non-three-dimensional (3D) image, so as to estimate a scene structure of the non-3D image in which depth information is neither explicitly included nor implicitly included unlike a stereo image that implicitly includes the depth information;
 a composing unit which generates a composed image of basic depth models by composing the images of the plurality of basic depth models generated from the generating unit according to the composition ratio;
a detecting unit which receives an object signal indicating object information about concavity and convexity of a pseudo 3D image from the non-3D image, and detects an average value, a minimum value, and a maximum value in one frame or one field of the object signal;
a processing unit which calculates a compensated object signal by compensating the object signal to provide a linear compensated object signal from a second maximum value to a second minimum value when the object signal changes from the minimum value to the average value and provide the linear compensated object signal from the second maximum value to the second minimum value when the object signal changes from the maximum value to the average value; and
an adding unit which adds the compensated object signal to the composed image of the basic depth models composed by the composing unit to generate depth estimation data for generating an image in a different viewpoint from the non-3D image, the image in the different viewpoint and non-3D image constituting a pseudo 3D image.

2. The depth estimation data generating apparatus of claim 1, wherein the processing unit:
calculates a difference value by subtracting the average value detected by the detecting unit from the object signal,
when the difference value is negative, calculates an object signal that is on negative side from the average value by performing a normalization process of dividing the difference value by a difference between the minimum value and the average value detected by the detecting unit and multiplying a predetermined value on the divided value, and
when the difference value is positive, calculates an object signal that is on positive side from the average value by performing a normalization process of dividing the difference value by a difference between the maximum value and the average value detected by the detecting unit and multiplying a predetermined value on the divided value.

3. The depth estimation data generating apparatus of claim 2, wherein the processing unit sets the predetermined value to a threshold value corresponding to an upper limit of a dynamic range of the object signal, and calculates the compensated object signal in which the second minimum value of the compensated object signal is limited to a negative value whose absolute value is the same as the threshold value and the second maximum value of the compensated object signal is limited to a positive value whose absolute value is the same as the threshold value.

4. A depth estimation data generating method comprising:
calculating a composition ratio between images of a plurality of basic depth models respectively indicating depth values of a plurality of basic scene structures, by using statistics of at least some pixel values in a predetermined region in a screen of a non-three-dimensional (3D) image, so as to estimate a scene structure of the non-3D image in which depth information is neither explicitly included nor implicitly included unlike a stereo image that implicitly includes the depth information;
generating a composed image of basic depth models by composing the images of the plurality of basic depth models according to the composition ratio;
receiving an object signal indicating object information about concavity and convexity of a pseudo 3D image from the non-3D image, and detecting an average value, a minimum value, and a maximum value in one frame or one field of the object signal;
processing a compensated object signal by compensating the object signal to provide a linear compensated object signal from a second maximum value to a second minimum value when the object signal changes from the minimum value to the average value and provide the linear compensated object signal from the second maximum value to the second minimum value when the object signal changes from the maximum value to the average value; and
adding the compensated object signal to the composed image of the basic depth models to generate depth estimation data for generating an image in a different viewpoint from the non-3D image, the image in the different viewpoint and non-3D image constituting a pseudo 3D image.

5. A non-transitory computer readable storage medium having recorded thereon a depth estimation data generating program, the program comprising:
calculating a composition ratio between images of a plurality of basic depth models respectively indicating depth values of a plurality of basic scene structures, by using statistics of at least some pixel values in a predetermined region in a screen of a non-three-dimensional (3D) image, so as to estimate a scene structure of the non-3D image in which depth information is neither explicitly included nor implicitly included unlike a stereo image that implicitly includes the depth information;
generating a composed image of basic depth models by composing the images of the plurality of basic depth models according to the composition ratio;
receiving an object signal indicating object information about concavity and convexity of a pseudo 3D image from the non-3D image, and detecting an average value, a minimum value, and a maximum value in one frame or one field of the object signal;
processing a compensated object signal by compensating the object signal to provide a linear compensated object signal from a second maximum value to a second minimum value when the object signal changes from the minimum value to the average value and provide the linear compensated object signal from the second maximum value to the second minimum value when the object signal changes from the maximum value to the average value; and
adding the compensated object signal to the composed image of the basic depth models to generate depth estimation data for generating an image in a different viewpoint from the non-3D image, the image in the different viewpoint and non-3D image constituting a pseudo 3D image.

6. A pseudo three-dimensional (3D) image generating apparatus comprising:
a different-viewpoint image generating unit which generates a different-viewpoint image from a viewpoint of a non-3D image, based on depth estimation data and non-3D image, by shifting a texture of the non-3D image by an amount according to the depth estimation data of a corresponding portion, the depth estimation data being generated by the depth estimation data generating apparatus of claim 1 which receives the non-3D image in which depth information is neither explicitly included nor implicitly included unlike a stereo image that implicitly includes the depth information; and an output unit which outputs a pseudo 3D image wherein one of the non-3D image and the different-viewpoint image is a left-eye image and the other is a right-eye image.

7. A pseudo three-dimensional (3D) image generating method comprising:

generating a different-viewpoint image from a viewpoint of a non-3D image, based on depth estimation data and the non-3D image, by shifting a texture of the non-3D image by an amount according to the depth estimation data of a corresponding portion, the depth estimation data being generated by the depth estimation data generating method of claim 4 from the non-3D image in which depth information is neither explicitly included nor implicitly included unlike a stereo image that implicitly includes the depth information; and outputting a pseudo 3D image wherein one of the non-3D image and the different-viewpoint image is a left-eye image and the other is a right-eye image.

8. A non-transitory computer readable storage medium having recorded thereon a pseudo three-dimensional (3D) image generating program, the program comprising:

generating a different-viewpoint image from a viewpoint of a non-3D image, based on depth estimation data and the non-3D image, by shifting a texture of the non-3D image by an amount according to the depth estimation data of a corresponding portion, the depth estimation data being generated by the depth estimation data generating program of claim 5 from the non-3D image in which depth information is neither explicitly included nor implicitly included unlike a stereo image that implicitly includes the depth information; and outputting a pseudo 3D image wherein one of the non-3D image and the different-viewpoint image is a left-eye image and the other is a right-eye image.

* * * * *